United States Patent [19]

Chenel et al.

[11] 4,085,238

[45] Apr. 18, 1978

[54] PROCESS AND APPARATUS FOR APPLYING PLASTIC FILAMENTS TO SHEETS FOR MULTIPLE PANE WINDOWS

[75] Inventors: Pierre Chenel, Enghien Les Bains; Jöel Vachet, Baudrieres, both of France

[73] Assignee: Saint-Gobain Industries, Neuilly-sur-Seine, France

[21] Appl. No.: 639,788

[22] Filed: Dec. 11, 1975

[30] Foreign Application Priority Data

Dec. 11, 1974 France .............................. 74 40825

[51] Int. Cl.[2] .......................... C03C 27/00; B25J 3/00

[52] U.S. Cl. .................................... 427/207 A; 118/6; 118/320; 156/109; 156/244.25; 156/292; 156/344; 156/500; 156/584; 427/284

[58] Field of Search ............... 156/167, 107, 109, 290, 156/292, 295, 356, 357, 578, 556, 344, 584, 244, 500; 427/207, 266, 28 X, 425, 207 A, 207 C, 207 R; 118/6, 205, 320, 321, 8; 214/15, 1 Q

[56] References Cited

U.S. PATENT DOCUMENTS

| | | | |
|---|---|---|---|
| 2,275,811 | 3/1942 | Woelfel | 52/203 |
| 3,391,805 | 7/1968 | Baden | 156/109 |
| 3,473,988 | 10/1968 | Rullier et al. | 156/109 |
| 3,573,149 | 3/1971 | Tibble | 156/107 |
| 3,876,489 | 4/1975 | Chenel | 156/107 |
| 3,886,013 | 3/1975 | Bouser et al. | 156/109 |
| 3,947,311 | 3/1976 | Jarchow et al. | 156/357 |

FOREIGN PATENT DOCUMENTS

| | | | |
|---|---|---|---|
| 2,128,717 | 12/1971 | Germany | 156/109 |
| 1,441,798 | 7/1976 | United Kingdom. | |
| 1,418,565 | 12/1975 | United Kingdom. | |

*Primary Examiner*—David Klein
*Assistant Examiner*—Michael W. Ball
*Attorney, Agent, or Firm*—Pennie & Edmonds

[57] ABSTRACT

A face of a sheet, e.g. of glass, is moved past an extrusion nozzle to deposit a plastic filament adjacent a first edge thereof. The movement is interrupted when a corner is reached. The nozzle and sheet are moved away from each other to detach the filament adjacent the corner and the sheet is rotated to present its next edge to the nozzle while retaining the continuity of the filament. The nozzle and sheet are then returned to depositing position and the relative movement resumed to deposit the filament adjacent the next edge. The apparatus includes means for raising the sheet from conveyor belts and raising the extrusion devive by a greater amount, and then turning the sheet by a suction cup arm, the sheet being supported by rollers during the turning. A detector monitors the position of the sheet and controls the operation of the apparatus.

12 Claims, 4 Drawing Figures

PROCESS AND APPARATUS FOR APPLYING PLASTIC FILAMENTS TO SHEETS FOR MULTIPLE PANE WINDOWS

The present invention relates to a process and apparatus for applying an intermediate filament of plastic material along the edges and at the corners of a sheet used in producing a multiple pane window. More particularly, the invention relates to a process and apparatus for extruding a plastic material on the face of a transparent or translucent sheet, more particularly a glass sheet, adjacent its four edges in succession in order to obtain, even at the corners at the sheet, a continuous and regular filament which forms an intermediate seal for a multiple pane window produced with the sheet.

Multiple pane insulating windows comprise a plurality of sheets formed of transparent or translucent material separated by intermediate seals or joints. Glass sheets are often used and it is this type of sheet to which reference will be made in the course of the following description. However, the invention is not limited to sheets made of glass.

In the case of multiple pane windows, the seals or joints have a dual function. On the one hand they seal the inner air spaces between the sheets of glass by preventing the passage of vapors and dust from the outside air. Secondly, they keep the sheets of glass firmly secured in place with respect to each other, both in a given position and with given mutual spacing.

The intermediate seals or joints, when made of plastic material, usually consist of a first inner filament formed of a material such as polyisobutylene and of an outer mastic seal formed of a second plastic material such as a silicone or polysulfide elastomer. The inner filament is often produced by the simultaneous extrusion of two filaments, one containing desiccant materials and the other formed without them.

This double filament acts, inter alia, as a spacer and also insures seal tightness, and maintains the desired air space therebetween. The outer mastic seal is injected between the inner filament and the edges of the sheets of glass, and maintains the unit in correct assembly by virtue of its excellent adhesive properties while simultaneously insuring seal tightness Multiple pane windows are generally manufactured on automatic assembly lines which essentially comprise conveying and handling elements, an extrusion machine for applying the inner filament, and a coating machine for coating the edges of the window with polysulfide mastic. Automatic assembly lines of this type are described in U.S. Pat. No. 3,876,489 and U.S. application Ser. No. 515,368 filed Oct. 16, 1974, now U.S. Pat. No. 4,014,733, and assigned to the assignee hereof. Various features of the extrusion machine and the coating machine are described in U.S. Pat. No. 3,473,988 and in British Patent Specification Nos. 1,441,798 and 1,418,565.

The inner filament applied on one of the sheets of glass should fulfill a number of requirements.

Firstly, the filament should have constant dimensions, both in terms of width and also of depth, and it should remain perpendicular to the plane of the sheet of glass, as any variation in its dimensions or in its angle of inclination may cause subsequent problems with seal-tightness and may impair the appearance of the window. When the machine applies the second sheet of glass on the filament, if the latter does not have a constant depth or is inclined in certain places, the second sheet will not bear on the filament at all points and it will not always be possible to eliminate the depth variations by pressing the two sheets together.

Secondly, the filament should be deposited at a constant distance from the edge of the window since undulations and curves will impair the appearance. When the window is mounted in the grooves of a window frame, the filament is usually not visible because its width is less than the depth of the groove. However, it will become visible at points where undulations have formed.

It is relatively simple to deposit the filament along the rectilinear edges of the glass sheets as this will be effected at constant speed and in a straight line. However, the positioning of the filament at the corners of the sheet is a particularly delicate operation as it is necessary to pivot the sheet of glass without producing any swellings, constrictions, narrowing or inclinations of the filament towards the inside or the outside. The greater the depth of the cord, the more difficult the positioning operation, as in the case of windows having a high insulation coefficient where the layer of air must be thick and the depth of the filament, i.e. the distance separating the two sheets of glass, may be greater than 10 mm and may reach or exceed 20 mm.

The present invention is designed to meet these requirements by providing a process and apparatus for producing a perfect filament, and consequently a perfectly sealed multiple pane window having a good appearance.

The process according to the invention is particularly characterized in that, in the proximity of the corners of the sheet, the process of extruding the filament is interrupted, displacement of the sheet is halted, and the extrusion nozzle is removed from the plane of the sheet in such a way as to detach the filament for a short distance adjacent the corner, without breaking the continuity of the filament. The sheet is then pivoted and the extrusion nozzle is returned to its work position, still preserving the continuity of the filament. Extrusion is recommenced and the sheet is once again moved beneath the nozzle along the next edge of the sheet.

The invention also relates to apparatus for implementing this process. In the specific embodiment described hereinafter the following combination of elements is employed:

Extrusion means for extruding a filament of plastic material designed to be moved toward and away from the sheet on which the filament is being deposited;

Conveying means adapted to move the sheets beneath the extrusion means;

Supporting means for the sheets designed to raise the sheets from the conveying means and means for raising the extrusion means by a greater amount during the turning of the sheets; these means then being returned to their initial positions for further extrusion of the filament;

Means for rotating the sheets, these means being vertically movable to engage the sheets and to be retracted therefrom; and Detection means for detecting the position of the sheets and adapted to control the action of the extrusion means, the conveying means, the supporting means, and the rotating means in proper synchronism.

Other objects and features of the invention will be made apparent in the following description of a specific embodiment thereof, with reference to the accompanying drawings in which.

Figure 1:
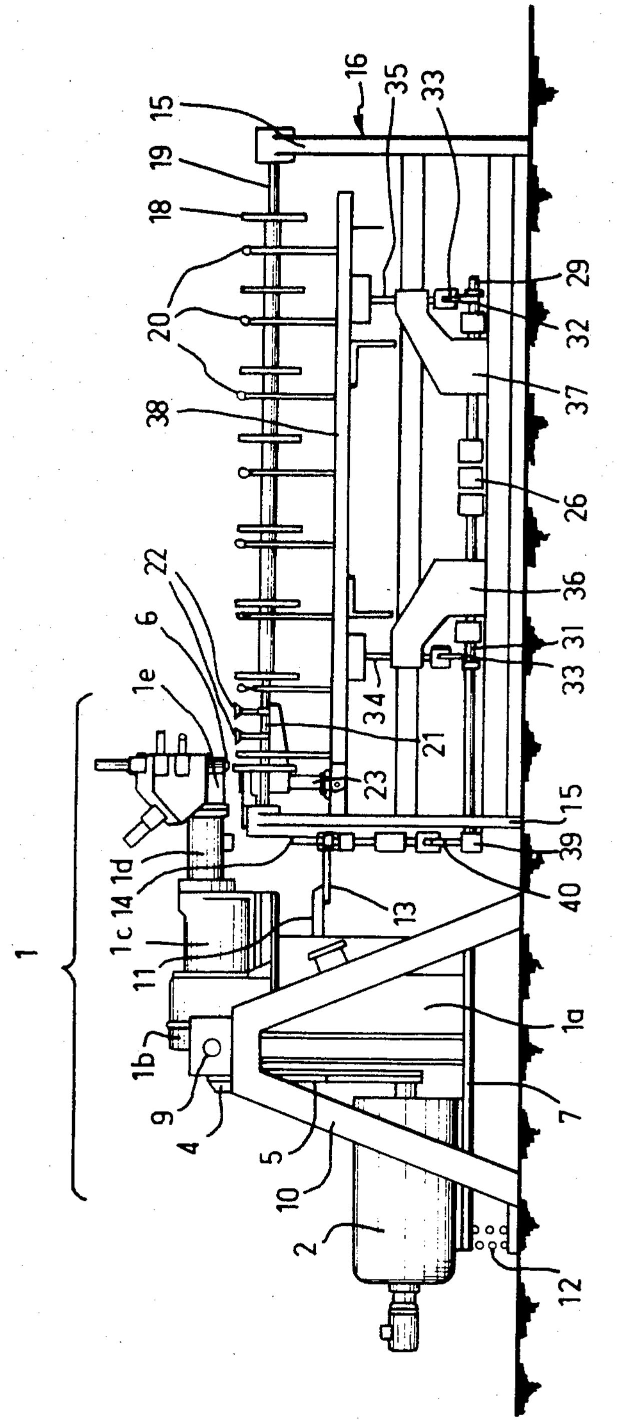
FIG. 1 is an elevation of the extrusion machine and the conveyor associated therewith.
Figure 2:
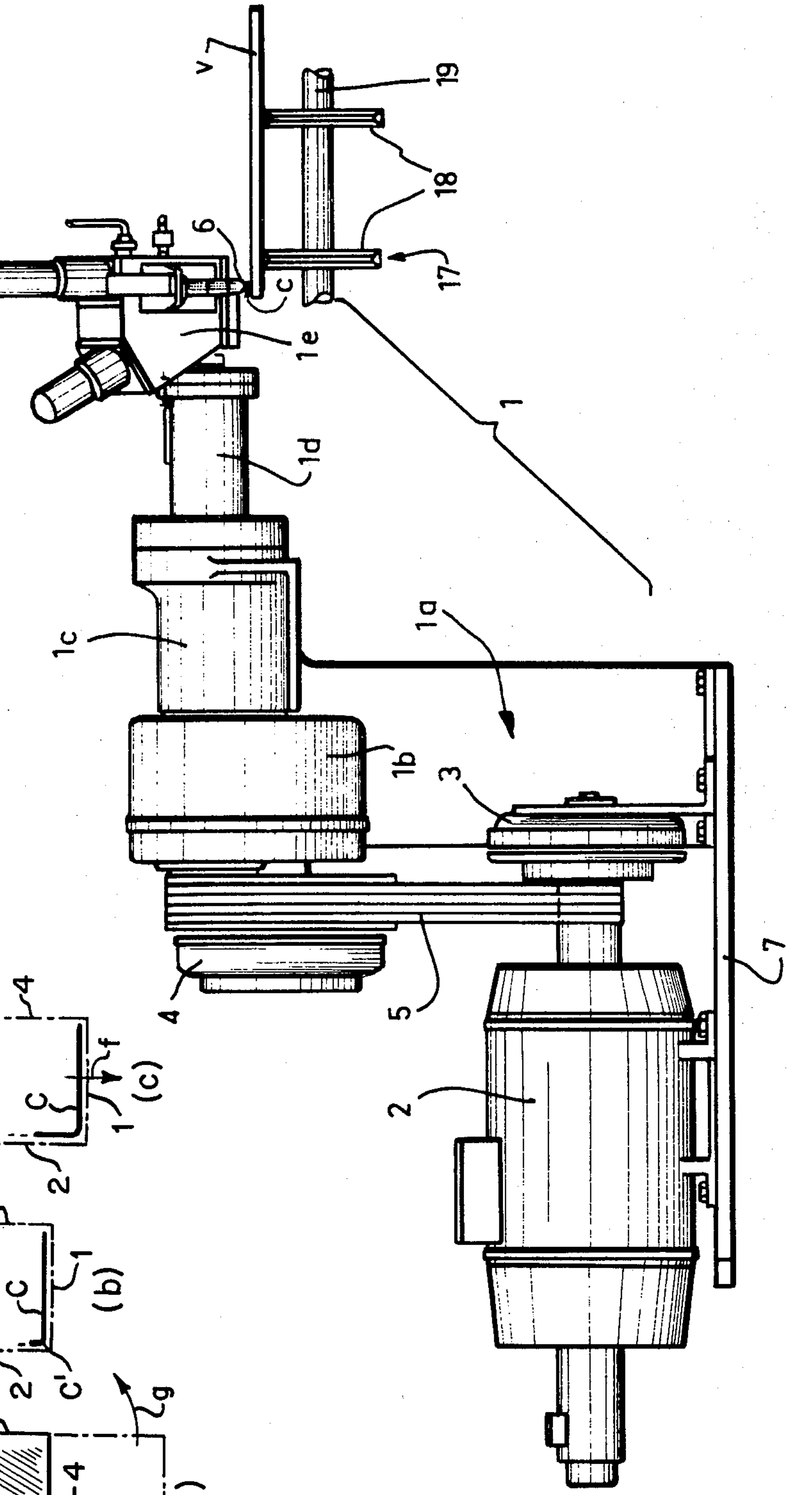
FIG. 2 is a detailed view of the extrusion machine and its motor.

Referring to FIG. 1, the extrusion machine 1 is driven by a motor 2 through the intermediary of gearing 3 (FIG. 2) and a belt system 5. An electromechanical or hydraulic brake 4 is provided. The machine includes a frame 1*a*, a speed reducer 1*b*, a bearing box 1*c*, a shaft 1*d*, and a head 1*e*. The latter carries an extrusion nozzle 6 from which is discharged a filament of plastic material which is visible at *c* in FIG. 2. The entire assembly is supported by a platform 7 which is pivotally mounted about a horizontal axis 9 in stationary frame 10. An abutment 11 is integral with frame 1*a* and is brought into contact, under the action of a compression spring 12, with a second abutment 13 mounted on a shaft 14 which is slidably mounted in bearing supports (not shown) of the frame 15 of the glass handling means 16.

Figure 3:
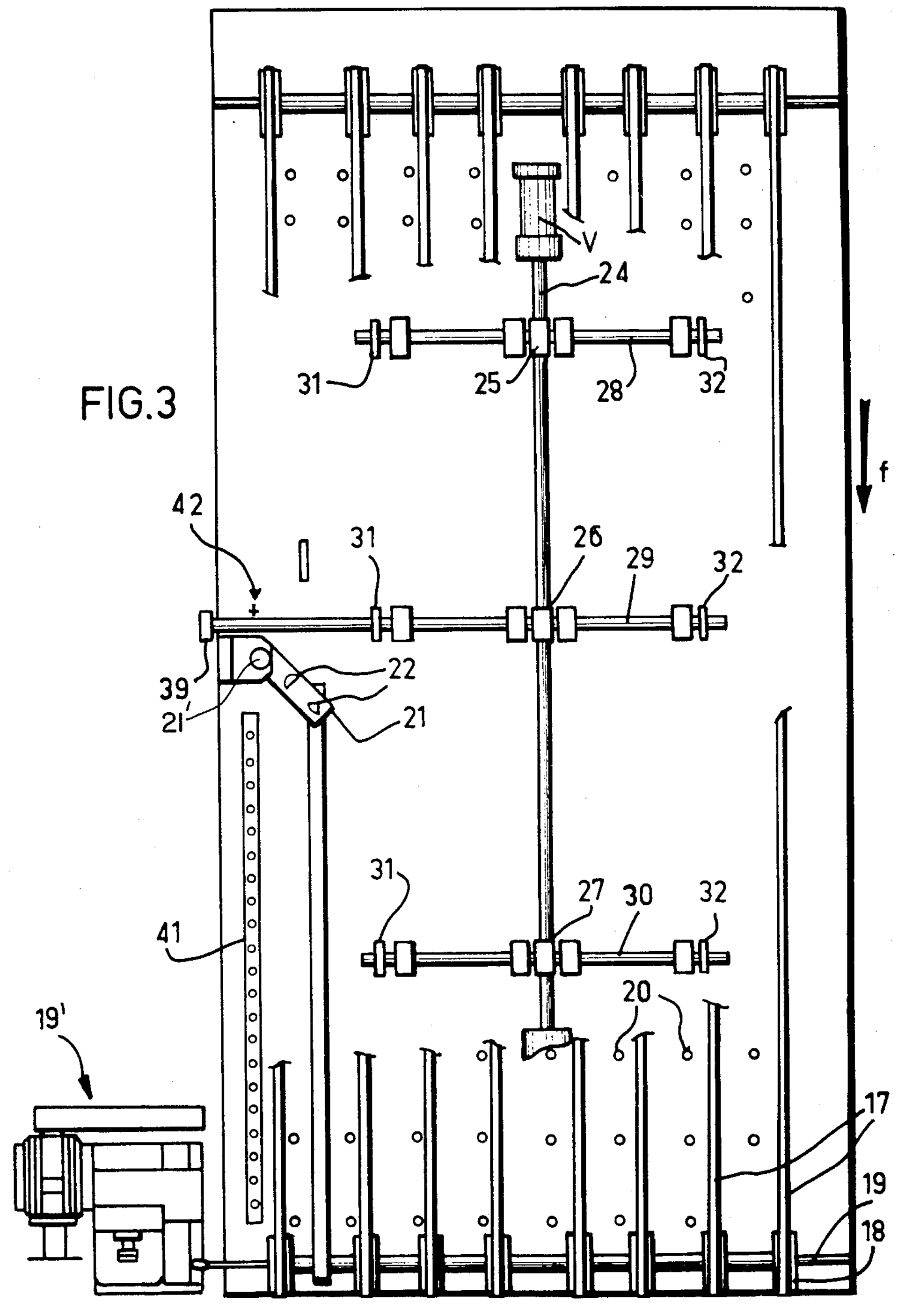
FIG. 3 is a schematic plan view of the comveyor.

The means 16, which are more readily visible in FIG. 3, comprise a horizontal belt conveyor 17 rotating about pulleys 18 provided on the shaft 19, and support means consisting of a network of spherical rollers 20 associated with a rotary mechanism comprising an arm 21 equipped with suction cups 22 pivotally mounted on member 23 (FIG. 1) for rotation about axis 21'. The shafts 19 are driven by a conventional motor-reducer unit 19'.

The belt conveyor 17 is designed to convey the glass sheet *v* (FIG. 2) beneath the extrusion nozzle 6 which deposits the filament *c* along the upper face of the sheet adjacent the edges thereof. The support means, when actuated, raise the sheet of glass from the plane of the conveyor 17 and keep it raised while the arm 21 of the rotary mechanism rotates the sheet of glass 90° by means of its suction cups 22, thereby moving a different edge of the sheet of glass beneath the extrusion nozzle.

This raising operation is effected by means which will now be described.

Beneath the conveyor 17 is situated a jack V, the shaft 24 of which rotates the transverse shafts 28, 29 and 30 through the intermediary of conventional link systems represented at 25, 26 and 27. The shafts 28, 29 and 30 each bear two cams 31 and 32 which actuate vertical shafts 34 and 35 through the intermediary of rollers 33. These vertical and transverse shafts are supported by the bearing supports 36 and 37. The upper ends of shafts 34 and 35 are secured to a frame 38 on which the network of spherical rollers 20, and member 23 with arm 21, are supported. The central shaft 29 is extended toward the left beyond the general frame 15. At its end, this shaft bears a cam 39 which actuates the shaft 14 through the intermediary of a roller 40, thus enabling the shaft 14 to be raised and lowered in its bearing supports which are attached to the general frame 15 but not represented in the figures.

A guide rail 41 provided with rollers having vertical axes is disposed parallel to the belts 17 on either side of the extrusion machine. This rail is used to guide and keep the edge of the glass sheets *v* parallel to the path of travel indicated by arrow *f*. A detector comprising a photoelectric cell diagrammatically indicated at 42 is disposed upstream of and at a specific distance from the axis of rotation 21' of arm 21. As is described below, this photoelectric cell is used to monitor the passage of the sheets of glass and actuate the lifting and rotating devices at the proper times.

The apparatus operates in the following manner:

The sheet of glass *v*, which arrives from a preceding machine such as a washing machine, is advanced on the conveyor belts 17 with one edge in contact with the guide rail 41. When the front or leading edge of the sheet intersects the optical axis of the detector 42, the extrusion operation begins, with a suitable time delay which may be regulated by known means. This delay is designed to allow the sheet of glass *v* time to reach a position beneath the extrusion nozzle 6. The sheet of glass continues to be moved beneath the nozzle and the extruded filament is deposited on the upper face of the sheet along the edge thereof.

When the trailing edge of the sheet passes the optical axis of the detector 42 the following operations are initiated with a predetermined delay:

The horizontal belt conveyor 17 is interrupted, thereby arresting the displacement of the sheet of glass *v*.

Power is supplied to the jack V, thereby rotating the shafts 28, 29 and 30 and the cams 31, 32 and 39 through the intermediary of the link system 25, 26 and 27.

As the cams 31 and 32 rotate, they push shafts 34 and 35 upward, thus raising the network of spherical rollers 20 and the arm 21 and its support 23 by a distance which may be designated *x*. The sheet of glass is thereby raised and supported above the belts 17. The cam 39 has a different eccentricity from that of cams 31, 32 in order to raise the extrusion nozzle, with a given angle of rotation of the shaft 19, by a distance *y* which is greater than the distance *x*. As a result, the filament is slightly raised and detached from the sheet of glass adjacent the corner thereof, thus enabling the sheet to be rotated while preserving the continuity of the filament.

Then a vacuum is produced in the suction cups 22 by conventional means (not shown), so that they grasp the glass sheet. Under the action of a conventional jack, the arm 21 is rotated 90° counterclockwise, thus rotating the sheet of glass about the corner thereof.

As soon as rotation of the arm 21 has ceased, the jack V is reversed and, as a result, the network of spherical rollers 20, the arm 21 and the extrusion nozzle 6 are moved to their lower positions such that the sheet of glass once again rests on the conveyor belts 17, and the nozzle is in proper position for applying the filament thereto. The vacuum to cups 23 is discontinued and extrusion begins. The horizontal belt conveyor 17 resumes its operation and thus the sheet of glass is moved beneath the extrusion nozzle so that the filament is applied adjacent the next edge thereof.

Figure 4:
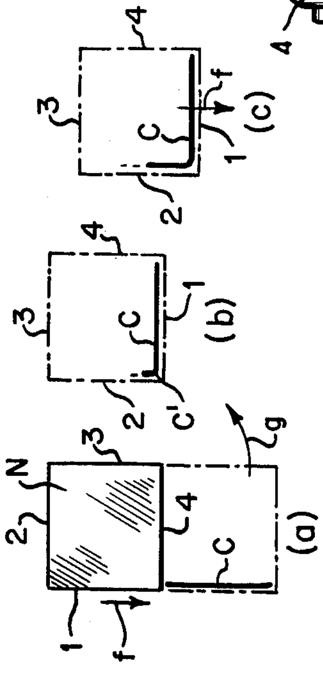
FIG. 4 is a detail showing the rotation of a glass sheet during the formation of the filament at a corner of the sheet.

The operation is further illustrated in FIG. 4. The edges of the glass sheet *v* are designated 1, 2, 3, 4. In the full line position in (*a*) the sheet has just reached the extrusion nozzle. As the sheet moves in the direction of arrow *f* the plastic filament *c* is applied to the face thereof along and adjacent edge 1. In the dot-dash position in (*a*) the filament has reached the corner of the sheet formed by edges 1 and 2. Movement of the sheet is then interrupted and the sheet rotated as indicated by arrow *g*, by the operations described above. In (*b*) the sheet has been rotated so that the next edge 2 is now parallel to the path of travel *f*. During the turning a corner *c'* has been formed in the filament without breaking the continuity thereof. Then the application of the filament is resumed, with the filament being deposited adjacent edge 2 as illustrated in (*c*). In subsequent cycles of operation corners of the filament may be formed at the junctions of edges 2–3 and 3–4, and the filament deposited adjacent all four edges of the face of the sheet.

By controlling the time delays which initiate the different operations described above, it is possible to optimally regulate the commencement of the operations as a function of the different parameters involved, such as the viscosity of the material forming the filament, the depth of the filament, the temperature, etc. It is also possible, by regulating the angular positions of the cams 31, 32 and 39 on their shaft, to regulate the distances $x$ and $y$, and accordingly to regulate the difference $z - x$ which represents the level to which the filament $c$ is raised with respect to the sheet of glass during the rotation operation.

By way of example, using the above-described process and apparatus, it was possible to deposit on the periphery of sheets of glass a filament of plastic material having a composition as described in copending application Ser. No. 639,786 entitled "Hermetic Seals in Multiple Pane Windows", filed concurrently herewith and assigned to the assignee hereof. The filament had a depth of 19 mm, rotation of the sheet of glass took about 3 seconds, and about 2 mm of the filament was temporarily detached during rotation of the sheet. These operations were effected continuously, automatically, and without human assistance, and enabled a filament to be deposited perfectly perpendicular to the plane of the sheet without producing any imperfections such as swellings, constrictions, narrowing or undulations, even at the corners.

As will be understood from the foregoing, the present invention provides, in the production of a multiple pane window, a process for applying a plastic filament to a face of a transparent or translucent sheet adjacent a plurality of edges thereof. The process comprises relatively moving a face of the sheet past an extrusion nozzle to deposit a plastic filament on the face adjacent a first edge thereof, interrupting the relative movement when a corner of the sheet is reached, moving the nozzle and sheet away from each other to detach the filament from the sheet adjacent the corner, and turning the sheet in the plane of the fare thereof relative to the nozzle to present the next edge of the face of the sheet to the nozzle while retaining the continuity of the filament, returning the nozzle and sheet to depositing position, and relatively moving the face of the sheet past the nozzle to deposit the nozzle adjacent the next edge. In the case of a rectangular sheet, the turning of the sheet is through 90°.

In accordance with the invention, apparatus for carrying out the above process includes an extrusion device, conveyor means for conveying a said sheet past said extrusion device in depositing relationship therewith to deposit a filament on a face of the sheet adjacent a first edge thereof, interrupting means for interrupting said conveying when a corner of the sheet is reached, separating means for separating the extrusion device from the face of the sheet to detach the filament from the sheet adjacent said corner while retaining the continuity of the filament, turning means for turning the sheet in the plane thereof about an axis adjacent said corner to present the next edge of the face of the sheet to said extrusion device while retaining the continuity of the filament, means for actuating said separating means to return the extrusion device and the sheet to depositing relationship, and means for resuming said conveying to deposit said filament adjacent said next edge. The turning means may be designed and adapted to turn the sheet through 90°. Further features of the apparatus of the invention are described above in connection with a specific embodiment thereof.

We claim:

1. A process for applying an intermediate filament of plastic material along the edges and at the corners of a transparent or translucent sheet used in producing a multiple pane window, said process comprising:

a. moving a face surface of the sheet on a conveyor past an extrusion nozzle while depositing a substantially continuous plastic filament on the face surface of the sheet adjacent a first edge thereof;

b. interrupting the relative movement of the sheet and the deposit of said plastic filament when a corner of the sheet is reached;

c. moving the extrusion nozzle and the sheet away from the conveyor and moving the extrusion nozzle relative the face of the sheet at the corner to detach a short distance of said plastic filament without breaking continuity of the plastic filament and thereafter;

d. turning the sheet in the plane of the face thereof relative the extrusion nozzle;

e. returning the extrusion nozzle and sheet to depositing position; and f. moving the face surface of the sheet past the extrusion nozzle while depositing said plastic filament along a second edge of the sheet.

2. A process in accordance with claim 1 for applying the filament to a rectangular sheet in which said turning turns the sheet through 90°.

3. An apparatus for applying an intermediate filament of plastic material along the edges and at the corners of a transparent or translucent sheet used in producing a multiple pane window, said apparatus comprising in combination:

a. an extrusion device having means for extruding a substantially continuous plastic filament on the face surface of the sheet adjacent a first edge thereof;

b. a conveyor for moving the sheet past the extrusion nozzle while depositing said plastic filament on the face surface of the sheet adjacent a first edge thereof;

c. means for interrupting the relative movement of the sheet and the deposit of said plastic filament when a corner of the sheet is reached;

d. means moving the extrusion nozzle and means moving the sheet away from the conveyor, said means for moving the extrusion nozzle separating the extrusion nozzle relative to the face of the sheet at the corner to effect detachment of a short distance of said plastic filament without breaking continuity of the plastic filament;

e. means for turning the sheet in the plane of the face thereof relative the extrusion nozzle about an axis adjacent the corner of the sheet; and f. means for returning the extrusion nozzle and sheet to said conveyor for moving the sheet past the extrusion nozzle while depositing said plastic filament along a second edge of the sheet.

4. Apparatus according to claim 3 in which said turning means is designed and adapted to turn the sheet through 90°.

5. Apparatus according to claim 3 wherein said extrusion device comprises a single nozzle member for depositing the plastic filament on the sheet.

6. Apparatus according to claim 3 in which said conveyor means conveys the sheet in horizontal orientation beneath said extrusion device, said interrupting means including means for raising the sheet from the conveyor means when a corner of the sheet reaches the extrusion device, said separating means including means for raising said extrusion device by a greater amount than the raising of the sheet, and said turning means being mounted for movement between a lower position out of contact with a said sheet and an upper position in contact with the sheet.

7. Apparatus according to claim 6 including detector means for monitoring the position of a sheet along its path of travel on the conveyor means and actuating said interrupting means, said separating means and said turning means.

8. Apparatus according to claim 6 in which said means for raising the sheet from the conveyor means includes a plurality of rollers for supporting the sheet as it is turned by said turning means.

9. Apparatus according to claim 8 in which said turning means includes an arm pivoted for rotation in a horizontal plane about an axis approximately in alignment with the nozzle of said extrusion device, and suction cup means in said arm for grasping said sheet during the turning thereof.

10. Apparatus according to claim 8 including a frame for supporting said rollers and said turning means, first cam means for raising and lowering said frame, second cam means for raising and lowering said extrusion device, and means for simultaneously actuating both of said cam means.

11. Apparatus according to claim 10 in which said second cam means has a greater eccentricity than the first cam means, whereby in the raised position of the cam means the extrusion device is raised above and away from a sheet supported on said rollers.

12. Apparatus according to claim 10 in which said extrusion device is mounted on a platform which is pivoted for rotation about a horizontal axis spaced from the extrusion device, and including spring means for biasing said platform toward a position in which the extrusion device is in depositing relationship with a said sheet, said second cam means being designed and adapted to raise said platform against said spring means.

* * * * *